United States Patent Office 3,485,860
Patented Dec. 23, 1969

3,485,860
4,5-DICYANO-1,3,2-DITHIARSENOLIUM SALTS
Erwin Klingsberg, Geneva, Switzerland, assignor to American Cyanamid Company, Stamford, Conn., a corporation of Maine
No Drawing. Filed Dec. 15, 1967, Ser. No. 690,802
Int. Cl. C07d 105/06; A01n 9/00
U.S. Cl. 260—440                              2 Claims

ABSTRACT OF THE DISCLOSURE

Dithiarsenolium salts of the formula

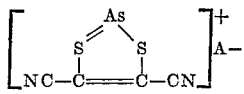

where $A^-$ is an anion such as iodide ion, and their use as fungicides.

---

This invention relates to novel heterocyclic cationic compounds of arsenic, more particularly described as dithiarsenolium salts, and their use as fungicides.

The compounds of the invention are 4,5-dicyano-1,3,2-dithiarsenolium salts of the formula:

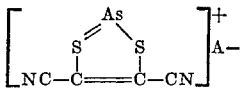

where $A^-$ is an anion, typically a halogen ($Cl^-$, $Br^-$, $I^-$), phosphate, sulfate, nitrate, nitrite, borate, or like anions which contribute to water solubility of the compounds.

Compounds of the above formula are prepared by reaction of an arsenous salt, such as arsenous iodide, with an alkali metal salt of dimercaptomaleonitrile in a water-miscible solvent such as dimethoxymethane:

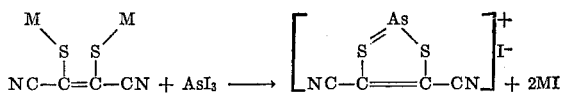

M in the above equation is an alkali metal cation such as sodium or potassium. Isolation is effected by dilution with water and precipitation with an acid such as hydriodic acid. The compound is conveniently purified by extraction with carbon disulfide and recrystallization from monochlorobenzene.

Other salts such as the bromide and perchlorate may be prepared from the iodide by ion exchange in aqueous solution at or below room temperature.

The 4,5-dicyano-1,3,2-dithiarsenolium salts are water soluble and are also soluble in water-miscible solvents such as the lower alkanols and dioxane. The compounds are powerful fungicides, being effective at concentrations as low as one part per million (0.0001%) in aqueous solution. The water solubility greatly enhances the value of the compounds as fungicides due to ease of formulation and application. Few fungicidal agents have this characteristic.

As fungicides the compounds may be added directly to the system to be protected against fungal growth or be rid of same. The compounds also may first be formulated with water singly or in admixture with adjuvants, such as other biocidal agents, and applied as concentrated or diluted sprays. Other known modes of formulation and application may be employed, as desired. For example, the compounds may be formulated as aerosol sprays or may be admixed with solid carriers such as clay, bentonite, pumice, fuller's earth, and the like, and applied as dusts.

Environments protected by application of the compounds of the invention include industrial systems such as machinery, cutting oils, drilling muds, and water employed for industrial processing. Other environments protected are porous substrates including textile materials, as formed fibers or fabric, natural or synthetic, or blends thereof, and cellulose products including paper, cardboard, and various cellulosic building or construction materials, such as fiber board. Such porous substrates are commonly subject to microbial deterioration by reason of exposure to fungus-carrying moisture.

The compounds also exhibit herbicidal activity at concentrations of 100 p.p.m. or higher.

The following nonlimiting examples illustrate this invention.

EXAMPLE 1

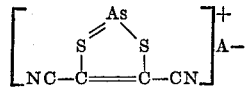

4,5-dicyano-1,3,2-dithiarsenolium iodide

To 5.6 grams dimercaptomaleonitrile, disodium salt, stirred in 100 milliliters dimethoxymethane is slowly added 9.1 grams arsenous iodide. The whole is stirred until the reaction is complete, requiring about a half hour. Two liquid phases form. The top dimethoxymethane layer is removed by evaporation. The lower layer, containing the product, is diluted with 100 milliliters water, clarified, and treated with about 30 milliliters hydriodic acid to precipitate the product. The product is isolated and dried in the dark.

The product is purified by Soxhlet extraction using carbon disulfide and recrystallized from monochlorobenzene to give crystals, M.P. 187.5–190.5° C. (corrected). The compound is soluble in water, ethyl acetate, and acetonitrile.

EXAMPLE 2

Fungicidal activity

A standardized spore suspension of a fungus is placed in a flask containing a 1% acetone-water solution and the compound of Example 1. Three such flasks are prepared having toxicant concentrations of 0.01%, 0.001% and 0.0001%. The flasks are tumbled for 24 hours. At the end of this time the suspension is examined and the percent inhibition of fungus spore growth recorded. Table I shows levels of control of two different fungi treated as just described.

TABLE I

| | Percent Inhibition of Fungus Spores in 24 hours | |
|---|---|---|
| | Stemphylium sarcinaeforme | Aspergillus niger |
| Percent Concentration of Compd. of Example 1: | | |
| 0.01 | 100 | 100 |
| 0.001 | 95 | 95 |
| 0.0001 | 0 | 95 |

EXAMPLE 3

In an agar-dilution test, the compound of Example 1, present in the amount of 0.01% concentration (100 p.p.m.) in an agar containing 10 grams neopeptone, 20 grams dextrose and 17 grams agar per liter, completely inhibits the growth of the following fungi:

*Fusarium oxysporum* f. *lycopersici*
*Monilinia fructicola*
*Pythium deBaryanum*
*Rhizoctonia solani*
*Colletotrichum orbiculare*
*Verticillium albo-atrum*

I claim:
1. A compound of the formula
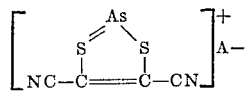
where A⁻ is an anion.
2. The compound of claim 1 which is 4,5-dicyano-1,3,2-dithiarsenolium iodide.
References Cited
UNITED STATES PATENTS
| | | | |
|---|---|---|---|
| 3,179,692 | 4/1965 | Martin | 260—440 X |
| 3,214,455 | 10/1965 | McKusick et al. | 260—440 X |
| 3,297,743 | 1/1967 | Blanchard | 260—440 X |
| 3,317,575 | 5/1967 | Breindel et al. | 260—440 |
| 3,365,478 | 1/1968 | Mosby | 260—440 |
| 3,397,217 | 8/1968 | Mosby et al. | 260—440 |
| 3,429,905 | 2/1969 | Mosby | 260—440 X |
TOBIAS E. LEVOW, Primary Examiner
W. F. L. BELLAMY, Assistant Examiner
U.S. Cl. X.R.
424—297